H. E. WALLACE.
MEANS FOR AUTOMATICALLY CONTROLLING ELECTRIC HEADLIGHTS FOR AUTOMOBILES.
APPLICATION FILED SEPT. 27, 1915.
1,304,000.
Patented May 20, 1919.
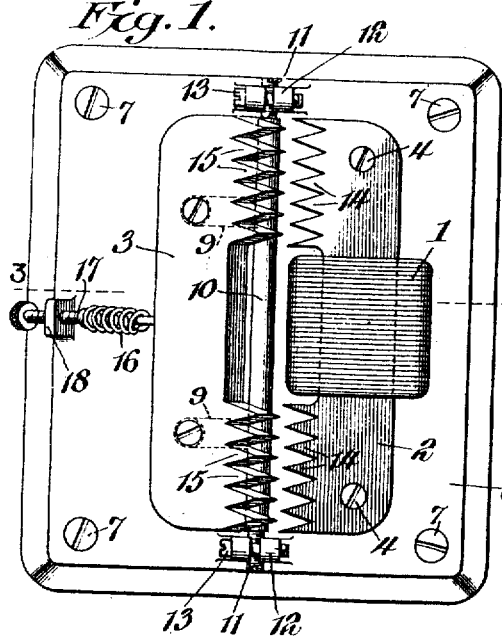
Fig. 1.
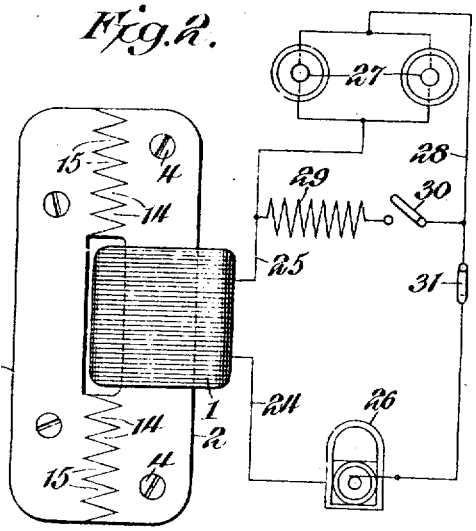
Fig. 2.
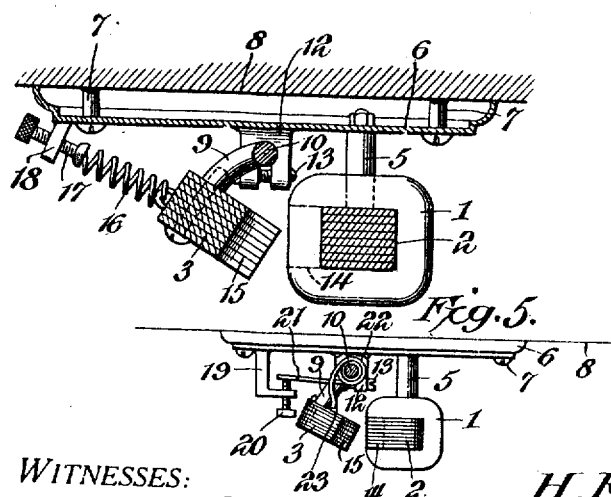
Fig. 3.
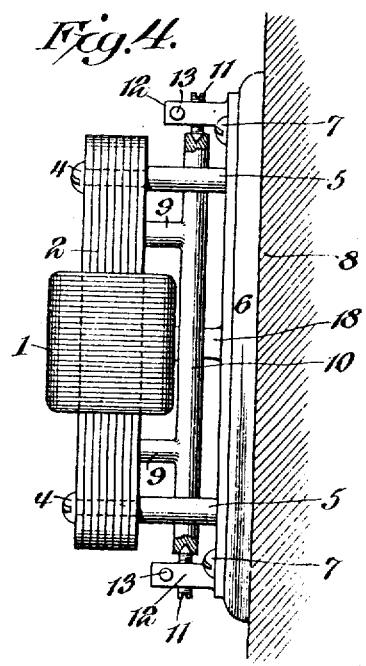
Fig. 4.
Fig. 5.
WITNESSES:
Howard D. Orr.
F. T. Chapman.
H. E. Wallace, INVENTOR,
BY E. G. Siggers
Attorney

UNITED STATES PATENT OFFICE.

HARRY E. WALLACE, OF PADUCAH, KENTUCKY, ASSIGNOR OF TWO-THIRDS TO FRANK M. FISHER, OF PADUCAH, KENTUCKY.

MEANS FOR AUTOMATICALLY CONTROLLING ELECTRIC HEADLIGHTS FOR AUTOMOBILES.

1,304,000. Specification of Letters Patent. Patented May 20, 1919.

Application filed September 27, 1915. Serial No. 52,902.

*To all whom it may concern:*

Be it known that I, HARRY E. WALLACE, a citizen of the United States, residing at Paducah, in the county of McCracken and State of Kentucky, have invented a new and useful Means for Automatically Controlling Electric Headlights for Automobiles, of which the following is a specification.

This invention has reference to means for automatically controlling head lights for automobiles, and its object is to provide means for the automatic control of the current supplied to the headlights of automobiles where the source of current is subject to great variation.

The present invention is designed particularly for use in connection with the illuminating system of the Ford automobile, although useful in the light system of other makes of automobiles where the condition is similar.

In the Ford automobile, the current supplied to the headlights is obtained from the magneto customarily carried by the automobile. Since such a magneto is driven by the engine of the vehicle, the output varies greatly with the speed of the engine. At low speed, the voltage, current and frequency are all low, while at high speed, the named characteristics are greatly increased. The result is that the lamps in the lighting system glow dimly at low speed and very brightly at high speed.

In accordance with the present invention, the lamps are arranged in multiple for a purpose which will hereinafter appear and inductive resistance is included in the circuit, the current being alternating in character, and the inductive resistance is supplied with a normally open magnetic circuit automatically gradually closing as the output of the magneto increases, the result being that the lamps may be so adjusted that they will glow at full brilliancy at low speed of the engine and the increasing output of the magneto is neutralized by the increasing resistance caused by the corresponding decrease in reluctance of the magnetic circuit associated with the inductive resistance. In this manner the lamps are maintained at approximately equal brilliancy for all engine speeds corresponding to low, intermediate and high speeds of the vehicle.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a front elevation of the improved device with the magnetic circuit open.

Fig. 2 is a diagram showing the inductive resistance with the magnetic circuit closed, and also showing the lighting system.

Fig. 3 is a section on the line 3—3 of Fig. 1.

Fig. 4 is an elevation with some parts in section, of the structure of Fig. 1, as viewed from the right hand thereof.

Fig. 5 is a detail view showing another form of regulating spring structure.

Referring to the drawings there is shown a coil 1, mounted intermediately of a member 2 of magnetic material. The coil 1 and member 2 will for convenience of description be termed a magnet of which the member 1 is the coil and the member 2 is the core. In operative relation to the core 2 is another similar member 3 of magnetic material mounted so as to move toward and from the core wherefore the member 3 will for convenience of description be termed an armature. The core 2 is secured by screws 4 to posts 5 erected on a suitable base plate 6 which in turn is assumed to be secured by screws 7 to a suitable support 8 which may represent any convenient part of an automobile.

The core 2 is built up of laminæ as is customary in instruments subjected to alternating currents.

The armature 3, like the core 2, is made up of laminæ and is mounted on posts 9 extending from a bar 10 which latter is arranged parallel with the armature 3 and at the ends is socketed to receive pointed screws 11 threaded through split blocks 12 erected on the base 6. The blocks 12 are made to clamp the screws 11 against accidental turning by other screws 13 as is customary in structures of like character.

The core 2 extends for a considerable distance beyond each end of the coil 1, which latter is located intermediate of the core and along that edge of the core presented toward the armature 3 the core is formed with saw-like teeth 14 while the armature 3 which is elongated like the core has similar teeth 15 along the edge presented toward the core. The teeth 14 and 15 are so located as to intermesh when the armature is moved into engagement with the core, each tooth 15 entering between two teeth 14.

The armature 3 is held normally away from the core 2 by means of a spring 16 fast at one end to the armature 3 and at the other end made fast to an adjusting screw 17 threaded through a block 18 projecting from the base plate 16.

In Fig. 5 there is indicated a somewhat different form of spring control for the armature which for some purposes is to be preferred to the arrangement shown in Figs. 1 and 3. In Fig. 5, the base plate adjacent to the rod 10 carries a post 19 through which is threaded a screw 20 bearing at one end against an extension 21 at one end of a helix 22 surrounding the rod or shaft 10 while the other end of the helix carries a hook 23 engaging about one of the posts 9 or engaging the latter in any other suitable manner.

The tendency of the spring 16 or 22, as the case may be, is to hold the armature away from the core, but still within the magnetic influence of the core.

The terminals of the coil 1 are connected to respective conductors 24, 25, of which the conductor 24 leads and is connected to one side of a magneto 26 which may be considered as the magneto usually present in the Ford automobile or may represent any other source of alternating current subjected to great variations in speed. The conductor 25 is connected in multiple to head lights 27, there customarily being two such head lights on an automobile. The other terminals of the head lights 25 are connected by a conductor 28 to the other side of the magneto 27. Branched between the conductors 25 and 28 is an ohmic resistance 29 together with a switch 30 by means of which the resistance 29 may be included in or cut out of the circuit. Another switch 31 is included in the magneto circuit as for instance in the conductor 28 so that the lights 27 may be energized or not, at the will of the operator.

When the engine of the automobile is at rest the parts are in the position shown in Figs. 1 and 3. When the engine is started, the magneto 26 is driven and assuming that the lamp circuit is closed, current is generated in the lamp circuit and flows through the coil 1 and through the lamps 27 in multiple. The alternations in the coil 1 set up a magnetic flux in the core 2 which flux extends across the air gaps between the teeth or corrugations 14 and 15 and is also established in the armature 3, but this magnetic flux because of the air gaps is feeble. As the magneto speed increases the current in the coil 1 correspondingly increases and there is a stronger magnetic flux in the core 2 and armature 3 tending to draw the armature toward the core, but this tendency is resisted by the spring controlling the armature. Ultimately, however, the speed of the magneto becomes sufficiently high to generate a current which will draw the armature into contact with the core. This brings about a closed magnetic circuit wherein the reactance on the coil is sufficient to choke back the current in the magneto circuit. The reactance of the magnetic circuit upon the coil 1 is of a gradually progressive increasing nature which may quite closely approach the tendency to increase the current in the magneto circuit due to the increasing speed of the magneto. This means that despite the increased speed of the magneto with its higher voltage and frequency, there is a correspondingly and automatically increased resistance to the production of current which would otherwise occur.

It follows then that the lamps 27 are caused to glow up to a certain brilliancy for which the lamps are designed, and then the increasing reactance set up in the circuit counter-acts the tendency to produce an increased current and the lamps remain approximately constant at their maximum glowing capacity, although in the absence of the controlling means such lamps would be energized to and beyond the danger point. The system may be so organized that the speed of the magneto at which the lamps are caused to glow with their maximum brilliancy corresponds to a low engine speed, so that the engine may be driven with increasing speed up to its highest speed without materially varying the brilliancy of the lamps.

With the present invention, it is quite feasible and highly advantageous to secure the necessary regulations with a minimum amount of material in the regulator and especially in the amount of wire in the regulating coil 1. A magneto such as is provided in the Ford automobile is limited in its output, particularly at low speed for then the voltage is low and it is desirable to have as little resistance in the circuit as possible in order that the lamps may then receive full current. The increased surfaces of the air gaps due to the teeth or corrugations permits a reduction in the number of turns of wire inversely proportional to the extent of the gap surface. Moreover, the corrugations or teeth afford a long and stable range for the movements of the armature.

The deep teeth or corrugations in both the magnet core and armature are for the purpose of increasing the area of the surfaces presented, thus promoting the proprogation of magnetic lines across the intervening space thereby to more nearly close the magnetic circuit without the magnet and armature being in actual contact. Because of the teeth or corrugations, the dimensions of the device are kept within reasonable bounds and the pull on the armature is distributed over and allows for a greater range of movement of the armature thus making it easily controlled, this being essential for satisfactory operation.

The resistance of the electrical circuit is also reduced by arranging the lamps in multiple.

Besides the greatly increased magnetism and consequent reaction on the coil by the closing of the air gap, such reaction is further greatly increased by reason of the increase in the rate of frequency due to the increased speed of the magneto.

The tension of the spring and its range are such that a slight increase in the current will cause it to permit the armature to assume the correct position for regulation and the combined reactive effect of the increase in magnetism and the increase in frequency limits the current circulating in the coil to nearly constant volume.

The purpose of the resistance 29 is to keep the circuit in proper balance should one of the lamps burn out, the resistance 29 being that of one of the lamps 27.

The area of the opposed portions of the core and armature constituting the air gap traversed by the magnetic lines of force represents many times the cross sectional area of either the core or the armature or both together. But because of the toothed or corrugated form of the surfaces thus presented one toward the other and the intermeshing of these surfaces as they approach, the actual size of the instrument is relatively small.

In describing the electric circuits as consisting of conductors, it will be understood that the usual custom of using a ground through portions of the metallic parts of the automobile engine or engine frame, may be followed.

In order to counteract the effects of the motion of the automobile it is advisable to counterbalance the armature, since movements imparted to the armature by shocks and jars incident to the travel of the vehicle are apt to interfere to some extent with the regulation.

What is claimed is:—

1. A regulator for an electric circuit provided with a current source subject to great variations in speed, comprising a reactance coil with a normally separated core and armature having those surfaces presented toward each other toothed or corrugated to provide an extended area representing many times the cross-sectional area of the core or armature, the teeth or corrugations on the respective parts being in alternation to intermesh when the armature is brought into close approach to the core.

2. A regulator for an electric circuit containing a source of current subject to great variations in speed and producing corresponding variations in voltage, comprising a coil, a core for the coil, and an armature for the core with yieldable means for resisting the movement of the armature toward the core, said core and armature having the surfaces presented toward each other toothed or corrugated with the teeth of one alternating with those of the other and movable into intermeshing relation therewith, whereby there are provided related magnetic surfaces representing many times the cross-sectional area of either the core or the armature.

3. A regulator for an electric circuit containing a source of current producing great variations in voltage, comprising a coil, a core for the coil, and an armature therefor with yieldable means for resisting the movement of the armature toward the core, said core and armature having those surfaces presented toward each other multi-toothed or corrugated with the teeth of one alternating with those of the other and the coil being of relatively small ohmic resistance as compared with the voltage output of the source of current.

4. A regulator for an electric circuit containing a source of current producing great variations in voltage, comprising a coil with a core extending from and beyond both ends of the coil and there provided with a series of teeth or corrugations on the same edge of the core, a pivoted armature in operative relation to and movable toward and from the core and where presented toward the toothed portion of the core provided with a like series of teeth alternating with those of the core for entrance between the teeth of the core, and elastic means yieldably constraining the core away from the armature.

In testimony that I claim the foregoing as my own, I have hereto affixed my signature in the presence of two witnesses.

HARRY E. WALLACE.

Witnesses:
H. L. GROGAN,
W. E. HUMPHREY.